US012034111B2

(12) United States Patent
Cojocaru et al.

(10) Patent No.: US 12,034,111 B2
(45) Date of Patent: Jul. 9, 2024

(54) SOLID COMPOSITE ELECTROLYTE

(71) Applicant: SOLVAY SPECIALTY POLYMERS ITALY S.P.A., Bollate (IT)

(72) Inventors: Paula Cojocaru, Legnano (IT); Alessandro Ghielmi, Frankfurt am Main (DE); Maurizio Biso, Milan (IT); Vincent Finsy, Halle (BE); Elena Molena, Bollate (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 545 days.

(21) Appl. No.: 17/422,473

(22) PCT Filed: Jan. 27, 2020

(86) PCT No.: PCT/EP2020/051859
§ 371 (c)(1),
(2) Date: Jul. 13, 2021

(87) PCT Pub. No.: WO2020/156972
PCT Pub. Date: Aug. 6, 2020

(65) Prior Publication Data
US 2022/0093959 A1    Mar. 24, 2022

(30) Foreign Application Priority Data
Jan. 30, 2019 (EP) .................................. 19154373

(51) Int. Cl.
*H01M 10/056* (2010.01)
*C08F 214/22* (2006.01)
*C08K 3/22* (2006.01)

(52) U.S. Cl.
CPC ....... *H01M 10/056* (2013.01); *C08F 214/225* (2013.01); *C08K 3/22* (2013.01); *C08K 2003/2203* (2013.01); *C08K 2003/221* (2013.01); *C08K 2003/2244* (2013.01); *C08K 2003/2258* (2013.01); *H01M 2300/0071* (2013.01); *H01M 2300/0082* (2013.01); *H01M 2300/0091* (2013.01)

(58) Field of Classification Search
CPC ....... H01M 10/056; H01M 2300/0071; H01M 2300/0082; H01M 2300/0091; H01M 4/623; H01M 10/0565; H01M 4/62; C08F 214/225; C08F 214/222; C08F 220/06; C08F 220/28; C08K 3/22; C08K 2003/2203; C08K 2003/221; C08K 2003/2244; C08K 2003/2258; C08J 2327/16; C08J 3/215; C08J 5/18; C08J 5/22; Y02E 60/10; C08L 27/06
See application file for complete search history.

(56) References Cited

U.S. PATENT DOCUMENTS

| | | | |
|---|---|---|---|
| 10,256,498 B2* | 4/2019 | Abusleme | H01M 50/403 |
| 2008/0268346 A1 | 10/2008 | Inda | |
| 2013/0260257 A1 | 10/2013 | Choi | |
| 2014/0120269 A1* | 5/2014 | Abusleme | H01M 10/04 427/532 |
| 2014/0170504 A1 | 6/2014 | Baek et al. | |
| 2016/0336618 A1 | 11/2016 | Lee et al. | |
| 2017/0141430 A1 | 5/2017 | Balsara et al. | |
| 2017/0222244 A1 | 8/2017 | Kim et al. | |
| 2018/0183055 A1* | 6/2018 | Chang | C01G 23/002 |
| 2018/0205112 A1 | 7/2018 | Thomas-Alyea et al. | |
| 2018/0254523 A1* | 9/2018 | Ahn | H01M 10/056 |
| 2022/0093959 A1* | 3/2022 | Cojocaru | H01M 10/0565 |

FOREIGN PATENT DOCUMENTS

| | | |
|---|---|---|
| CN | 105098234 A1 | 11/2015 |
| CN | 107195962 A | 9/2017 |
| CN | 108091928 A | 5/2018 |
| CN | 108365262 A | 8/2018 |
| CN | 108511793 A | 9/2018 |
| DE | 102016215064 A1 | 2/2018 |
| JP | 4253051 B2 | 4/2009 |
| JP | 2016212990 A † | 12/2016 |
| JP | WO2016017759 A1 † | 4/2017 |
| KR | 20180051716 A | 5/2018 |
| WO | 2007006645 A1 | 1/2007 |
| WO | 2007006646 A1 | 1/2007 |

OTHER PUBLICATIONS

Murugan R. et al., "Fast Lithium Ion Conduction in Garnet-Type Li7La3Zr2O12", Angew. Chem. Int. Ed., 2007, vol. 46, p. 7778-7781.
Tong X. et al., "Highly Conductive Li Garnets by a Multielement Doping Strategy", Inorg. Chem., 2015, vol. 54 (7), p. 3600-3607—American Chemical Society.

* cited by examiner
† cited by third party

Primary Examiner — Abdullah A Riyami
Assistant Examiner — Nader J Alhawamdeh
(74) Attorney, Agent, or Firm — Osha Bergman Watanabe & Burton LLP

(57) ABSTRACT

The present invention pertains to an ionically conductive composition comprising at least one ionic conductive solid inorganic substance and at least one copolymer of vinylidene fluoride, to a process for its manufacture and to the use thereof for manufacturing components for solid state batteries.

17 Claims, No Drawings

SOLID COMPOSITE ELECTROLYTE

CROSS-REFERENCE TO RELATED APPLICATIONS

This application is a U.S. national stage entry under 35 U.S.C. § 371 of International Application No. PCT/EP2020/051859 filed Jan. 27, 2020, which claims priority to European application No. 19154373.5, filed on Jan. 30, 2019. The entire contents of these applications are explicitly incorporated herein by this reference.

TECHNICAL FIELD

The present invention pertains to a composition comprising at least one ionic conductive solid inorganic substance and at least one ionically non-conductive copolymer of vinylidene fluoride, said composition being suitable for use in the preparation of components for secondary batteries, for solid state batteries in particular.

BACKGROUND ART

For more than two decades, Li-ion batteries have retained dominant position in the market of rechargeable energy storage devices due to their light weight, reasonable energy density and good cycle life. Nevertheless, current Li-ion batteries, comprising liquid electrolytes based on organic carbonates, suffer from poor safety and relatively low energy density with respect to the required energy density for high power applications such as electrical vehicles (EVs), hybrid electrical vehicles (HEVs) and grid energy storage. It is the presence of liquid electrolyte that is at the basis of these shortcomings, due to its leakage and generation volatile gaseous species, which are flammable.

Solid state batteries (SSB) are hence believed to be the next generation of energy storage devices, because they provide higher energy density and are safer than the conventional Li-ion batteries with liquid electrolyte system. In a SSB, the highly flammable liquid electrolyte is replaced by a solid electrolyte so that all risk of ignition and/or explosion is substantially removed.

Among solid electrolytes, composite electrolytes composed of solid inorganic ionic (Li+) conducting particles (SIC particles), dispersed into a polymeric matrix, offer the possibility to combine high ionic conductivity with good mechanical properties.

Fluororesins such as vinylidene fluoride-based copolymers have been used as polymeric matrix for forming solid composite electrolytes and as binder for preparing electrodes. In particular, polyvinylidene fluoride (PVDF), providing good flexibility and good mechanical strength, is a preferred binder material for solid composite electrolytes and for electrodes.

US 2013/0260257 (Samsung Corning Precision Materials Co., Ltd.) discloses a thin and flexible electrolyte comprising inorganic particles and PVDF as binder, that provides solid ceramic electrolytes having excellent ionic conductivity.

CN105098234 (CHINESE ACAD PHYSICS INST. and NINGDE AMPEREX TECHNOLOGY LTD) discloses a solid electrolyte material comprising a PVDF polymer binder and a lithium oxide electrolyte inorganic filler.

JP4253051 (KUREHA CHEMICAL IND CO LTD) discloses a stable electrode material mixture for forming a positive electrode for use in non-aqueous batteries which contains lithium-based mixed metal oxide and, as a binder, a vinylidene fluoride copolymer comprising at least 70 mole percent vinylidene fluoride units and at least 0.5 mole percent chlorotrifluoroethylene. Said mixture shows a reduced tendency to gelation when used in the preparation of electrode forming compositions.

However, PVDF, in particular when used in the form of slurry including inorganic particles, has an important drawback, in that the slurry often undergoes to a rapid viscosity increase, leading to the formation of a gel.

This instability of the slurry causes the impossibility to cast it for producing membranes to be used as solid composite electrolytes or in the preparation of electrodes.

The present invention provides a composition capable of preventing gelation while, at the same time, enabling the manufacturing of solid composite electrolyte and electrodes delivering a particularly advantageous combination of properties, e.g., ionic conductivity and mechanical properties, which make them useful as components in solid state batteries.

DISCLOSURE OF INVENTION

The Applicant has now found that compositions including ionic conductive inorganic particles and certain VDF-based copolymers conveniently have high gelation-resistance behaviour, and may be easily processed to manufacture solid composite electrolyte characterized by improved ionic conductivity and improved mechanical properties.

It is thus an object of the invention an ionically conductive composition (C) suitable for use in the preparation of components for solid state batteries, said composition comprising:

i) at least one ionic conductive solid inorganic substance in the form of powder [inorganic particle (IP)] having the following general formula:

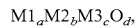

wherein

M1 is a first cationic element selected from the group consisting of H, Li, Na, and Ga, preferably Li;

M2 is a second cationic element selected from the group consisting of La, Ba, Sr, Ca, In, Mg, Y, Sc, Cr, Al, K, Ce, Pr, Nd, Pm, Sm, Eu, Gd, Tb, Dy, Ho, Er, Tm, Yb and Lu;

M3 is a third cationic element selected from the group consisting of Zr, Ta, Nb, Sb, Sn, Hf, Bi, W, Si, Se, Ga and Ge; and a, b, c, and d are positive numbers including various combinations of integers and decimals;

ii) at least one vinylidene fluoride (VDF) copolymer [polymer (A)] that comprises:
  (a) recurring units derived from vinylidene fluoride (VDF);
  (b) recurring units derived from at least one fluorinated monomer different from VDF [monomer (FM)] selected from the group consisting of:
    (b-1) $C_2$-$C_8$ fluoro- and/or perfluoroolefins such as tetrafluoroethylene (TFE), hexafluoropropylene (HFP), pentafluoropropylene and hexafluoroisobutylene;
    (b-2) $C_2$-$C_8$ hydrogenated monofluoroolefins, such as vinyl fluoride; 1,2-difluoroethylene and trifluoroethylene (TrFE);
    (b-3) perfluoroalkylvinylethers complying with formula $CF_2=CFOR_{f1}$, in which $R_{f1}$ is a $C_1$-$C_6$-perfluoroalkyl group; and
    (b-4) perfluorooxyalkylvinylethers complying with formula $CF_2=CFOR_{OF}$, with $R_{OF}$ being a $C_1$-$C_{12}$- perfluorooxyalkyl, which comprises one or more than one ethereal oxygen atom; and preferably $R_{OF}$ being a group of formula —$CF_2OR_{f2}$ or —$CF_2CF_2OR_{f2}$, with $R_{f2}$ being a $C_1$-$C_6$ perfluoroalkyl; a (b-5) chloro- and/or bromo- and/or iodo-$C_2$-$C_6$ fluoroolefins, such as chlorotrifluoroethylene (CTFE); and (c) optionally, recurring units derived from at least one hydrophilic (meth)acrylic monomer (MA) of formula (I):

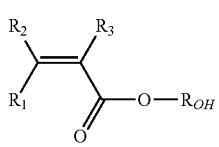

wherein each of $R_1$, $R_2$, $R_3$, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one —OH group, iii) at least one solvent (S) selected from the group consisting of:
alcohols such as methyl alcohol, ethyl alcohol and diacetone alcohol,
ketones such as acetone, methylethylketone, methylisobutyl ketone, diisobutylketone, cyclohexanone and isophorone,
linear or cyclic esters such as isopropyl acetate, n-butyl acetate, methyl acetoacetate, dimethyl phthalate and γ-butyrolactone,
linear or cyclic amides such as N,N-diethylacetamide, N,N-dimethylacetamide, dimethylformamide and N-methyl-2-pyrrolidone, and
dimethyl sulfoxide.

A second object of the invention is a process for manufacturing the composition (C) as detailed above.

Composition (C) is suitable for use in the preparation of composite solid electrolytes for solid state batteries.

A third object of the invention is thus a process for manufacturing a solid composite electrolyte comprising the steps of:

I) processing the composition (C) as above defined to form a wet film of a solid composite electrolyte; and II) drying the wet film provided in step (I) to obtain a solid composite electrolyte.

In a fourth object, the present invention pertains to the solid composite electrolyte obtainable by the process as above defined.

Composition (C) is also suitable for use in the preparation of electrodes for solid state batteries.

A further object of the invention is thus a process for manufacturing an electrode for solid state battery comprising the steps of:

I) providing an electrode-forming composition comprising the composition (C) as above defined and at least one electrode active material; and II) providing a metal substrate having at least one surface;

III) applying the composition (C) provided in step I) onto the at least one surface of the metal substrate provided in step II), thereby providing an assembly comprising a metal substrate coated with said composition (C) onto the at least one surface;

IV) drying the assembly provided in step III).

In still a further object, the present invention provides an electrochemical device comprising a solid composite electrolyte and/or at least one electrode of the present invention.

DESCRIPTION OF EMBODIMENTS

In the context of the present invention, the term "weight percent" (wt %) indicates the content of a specific component in a mixture, calculated as the ratio between the weight of the component and the total weight of the mixture. When referred to the recurring units derived from a certain monomer in a polymer/copolymer, weight percent (wt %) indicates the ratio between the weight of the recurring units of such monomer over the total weight of the polymer/copolymer. When referred to the total solid content of a liquid composition, weight percent (wt %) indicates the ratio between the weight of all non-volatile ingredients in the liquid.

The composition (C) according to the invention comprises i) at least one ionic conductive solid inorganic substance in the form of powder [inorganic particle (IP)].

According to a first embodiment of the invention, said at least one inorganic particle (IP) is a garnet-type inorganic particle.

According to a second embodiment of the invention, the said at least one inorganic particle (IP) is an oxide inorganic particle which is not a garnet-type.

The term "garnet" as used herein refers to the atomic structure of crystalline or partially crystalline oxide ceramic solid.

In a preferred embodiment, the at least one inorganic particle (IP) is the garnet-type inorganic particle $Li_7La_3Zr_2O_{12}$ (LLZO).

In a more preferred embodiment, the at least one inorganic particle (IP) is a doped-LLZO inorganic particle having a general formula of $Li_xLa_yZr_zA_wO_{12}$, wherein:

A represents one or several dopants selected from the group consisting of Al, Ga, Nb, Fe, Nd, Pt, Ta, W, Mo, Hf, Si, Ca, Sr, Ba, Ge, and mixtures thereof; preferably from the group consisting of Al, Ga, Nb, Fe, Nd, Pt, Ta, W, and mixtures thereof; more preferably from the group consisting of Al, Ga, W, and mixtures thereof;

w, x, y, and z are positive numbers, including various combinations of integers and fractions or decimals;
$0<y\leq3$; preferably $2\leq y\leq 3$; preferably $2.5\leq y\leq 3$;
$0<z\leq2$; preferably $1\leq z\leq 2$; preferably $1.5\leq z\leq 2$;
$0\leq w\leq 0.5$; preferably $0\leq w\leq 0.35$; more preferably $0\leq w\leq 0.25$; and
x is derived from electroneutrality of the garnet structure.

According to a still preferred embodiment, the at least one inorganic particle (IP) is a doped-LLZO doped with Al, W, Ga or combinations thereof.

The general formulas given in the present application correspond to the stoichiometry of the crystalline structure given by x-ray diffraction (XRD).

LLZO and doped-LLZO can be prepared according to standard procedure known from state of the art, for instance in Inorg. Chem., 2015, 54, 3600-3607, and in Angew. Chem. Int. Ed. 2007, 46, 7778-7781.

In the present invention, the term "solid composite electrolyte" refers to a composite material having lithium ionic conductivity which has a freestanding shape at room temperature without a support, and may be in the form of a foldable, flexible and self-standing film The solid composite electrolyte according to the present invention does neither flow to take on the shape of its container, nor does it expand to fill the entire volume available. On the other hand, the solid composite electrolyte according to the present invention may be shaped in a variety of manner due to its flexibility and hence may accommodate a change in either volume or shape which may happen during charging and discharging of a lithium battery.

The amount of the at least one solid inorganic particle (IP) in composition (C) is suitably from 50.0 to 99.0 wt %, based on the total weight of the inorganic particle (IP) and the polymer (A) in the composition (C).

By the term "recurring unit derived from vinylidene difluoride" (also generally indicated as vinylidene fluoride 1,1-difluoroethylene, VDF), it is intended to denote a recurring unit of formula $CF_2=CH_2$.

The term "at least one fluorinated monomer different from VDF [monomer (FM)]" is understood to mean that the polymer (A) may comprise recurring units derived from one or more than one fluorinated monomer (FM) as above described.

Preferred perfluoroalkylvinylethers complying with formula $CF_2=CFOR_{f1}$ include, notably, those wherein $R_{f1}$ is the perfluorinated alkyl group —$CF_3$ (perfluoromethylvinylether (PMVE)), —$C_2F_5$ (perfluoroethylvinylether (PEVE)), —$C_3F_7$ (perfluoropropylvinylether (PPVE)), or —$C_4F_9$ or a —$C_5F_{11}$ group.

In one embodiment according to the present invention, the polymer (A) comprises recurring units derived from at least one hydrophilic (meth)acrylic monomer (MA) of formula (I):

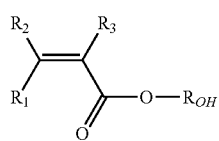

wherein each of $R_1$, $R_2$, $R_3$, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one —OH group, Non limitative examples of hydrophilic (meth)acrylic monomers (MA) are notably acrylic acid, methacrylic acid, hydroxyethyl (meth)acrylate.

Should the hydrophilic (meth)acrylic monomer (MA) of formula (I) be comprised in polymer (A), it is typically comprised in an amount of from 0.05% to 2% by moles, preferably from 0.1 to 1.8% by moles, more preferably from 0.2 to 1.5% by moles with respect to the total moles of recurring units of polymer (A).

The at least one polymer (A) in the composite electrolyte composition of the present invention, is preferably a ionically non-conductive (VDF) copolymer comprising:
(a) at least 60% by moles of recurring units derived from VDF;
(b) at least 2% by moles of recurring units derived from monomer (FM);
(c) optionally from 0.05% to 2% by moles, preferably from 0.1% to 1.8% by moles, more preferably from 0.2% to 1.5% by moles of recurring units derived from at least one monomer (MA), wherein all the aforementioned % by moles is referred to the total moles of recurring units of the polymer (A).

Non-limiting examples of polymer (A) useful in the present invention are, notably, VDF/TrFE copolymers, VDF/PMVE/AA copolymers, VDF/HFP copolymers, VDF/CTFE copolymers, VDF/HFP/HEA copolymers, and the like.

Accordingly, polymer (A) is more preferably a ionically non-conductive (VDF) copolymer consisting essentially of:
(a) at least 60% by moles of recurring units derived from VDF;
(b) at least 0.5% by moles of recurring units derived from monomer (FM), said monomer (FM) being preferably selected in the group consisting of TrFE, PMVE, HFP and CTFE;
(c) optionally from 0.05% to 2% by moles, preferably from 0.1% to 1.8% by moles, more preferably from 0.2% to 1.5% by moles of recurring units derived from at least one monomer (MA), wherein all the aforementioned % by moles is referred to the total moles of recurring units of polymer (A).

In a preferred embodiment, the ionically non-conductive polymer (A) is a VDF/TrFE copolymer wherein the recurring units derived from TrFE monomer are preferably comprised in polymer (A) in an amount of from 20% to 40% by moles, preferably from 25% to 35% by moles more preferably of about 30% by moles with respect to the total moles of recurring units of polymer (A).

More preferably, according to this embodiment, the ionically non-conductive polymer (A) is a VDF/TrFE copolymer consisting essentially of:
(a) at least 65% by moles of recurring units derived from VDF;
(b) at most 35% by moles of recurring units derived from TrFE.

In a preferred embodiment, the ionically non-conductive polymer (A) is a VDF/CTFE copolymer wherein the recurring units derived from CTFE monomer are preferably comprised in polymer (A) in an amount of from 5% to 15% by moles, preferably from 7% to 12% by moles more preferably of about 7.5% by moles or of about 10% by moles with respect to the total moles of recurring units of polymer (A).

More preferably, according to this embodiment the ionically non-conductive polymer is VDF/CTFE copolymer consisting essentially of:
(a) at least 85% by moles of recurring units derived from VDF;
(b) at most 15% by moles of recurring units derived from CTFE.

In another preferred embodiment, the ionically non-conductive polymer (A) is a VDF/HFP copolymer wherein the recurring units derived from HFP monomer are preferably comprised in polymer (A) in an amount of from 4 to 10% by moles, preferably from 5 to 9% by moles with respect to the total moles of recurring units of polymer (A).

More preferably, according to this embodiment, the ionically non-conductive polymer is VDF/HFP copolymer consisting essentially of:
(a) at least 90% by moles of recurring units derived from VDF;
(b) at most 10% by moles of recurring units derived from HFP.

In another preferred embodiment, the ionically non-conductive polymer (A) is a VDF/PMVE/AA copolymer wherein the recurring units derived from PMVE monomer are preferably comprised in polymer (A) in an amount of from 0.5% to 5% by moles, preferably from 0.5% to 3% by moles, and recurring units derived from AA are preferably comprised in polymer (A) in an amount of from 0.2% to 2% by moles, wherein the percentage amounts are with respect to the total moles of recurring units of polymer (A).

More preferably, according to this embodiment, the ionically non-conductive polymer is VDF/PMVE/AA copolymer consisting essentially of:

(a) at least 93% by moles of recurring units derived from VDF;

(b) at most 5% by moles of recurring units derived from PMVE;

(c) at most 2% by moles of recurring units derived from AA.

In another preferred embodiment, the ionically non-conductive polymer (A) is a VDF/HFP/HEA copolymer wherein the recurring units derived from HFP monomer are preferably comprised in polymer (A) in an amount of from 1% to 5% by moles, preferably from 1.5% to 3% by moles, and recurring units derived from AA are preferably comprised in polymer (A) in an amount of from 0.2% to 2% by moles, wherein the percentage amounts are with respect to the total moles of recurring units of polymer (A).

More preferably, according to this embodiment, the ionically non-conductive polymer is VDF/HFP/HEA copolymer consisting essentially of:

(a) at least 93% by moles of recurring units derived from VDF;

(b) at most 5% by moles of recurring units derived from HFP;

(c) at most 2% by moles of recurring units derived from HEA.

Defects, end chains, impurities, chains inversions or branchings and the like may be additionally present in polymer (A) in addition to the said recurring units, without these components substantially modifying the behaviour and properties of polymer (A).

Determination of average mole percentage of monomer (MA), of monomer (FM) and of VDF recurring units in polymer (A) can be performed by any suitable method, NMR being preferred.

The polymer (A) is typically obtainable by emulsion polymerization or suspension polymerization of a VDF monomer, at least one fluorinated monomer (FM) and optionally at least one hydrogenated (meth)acrylic monomer (MA), according to the procedures described, for example, in WO 2007/006645 and in WO 2007/006646.

The polymerization reaction is generally performed at temperatures of between 25 and 150° C., at a pressure of up to 130 bar.

Polymer (A) is typically provided in the form of powder.

In the present invention, at least one additive may be additionally present in the composition (C). Examples of suitable additives include, but not limited to, Li salts, dispersants, wetting agents, viscosity diluters and anti-swelling agents.

The preferred lithium salts are lithium hexafluorophosphate ($LiPF_6$), lithium bis(fluorosulfonyl)imide $Li(FSO_2)_2N$ (LiFSI), lithium 2-trifluoromethyl-4,5-dicyanoimidazole (LiTDI), $LiBF_4$, $LiB(C_2O_4)_2$, $LiAsF_6$, $LiClO_4$, $LiNO_3$, lithium bis(osalato)borate, $LiCF_3SO_3$, $LiN(SO_2CF_3)_2$ (LiTFSI), $LiN(SO_2C_2F_5)_2$, $LiC(SO_2CF_3)_3$, $LiN(SO_3CF_3)_2$, $LiC_4F_9SO_3$, $LiCF_9SO_3$, $LiAlCl_4$, $LiSbF_6$, LiF, LiBr, LiCl, LiOH, LiPFSi, and lithium trifluoromethanesulfonate The more preferred lithium salts are lithium hexafluorophosphate ($LiPF_6$), lithium bis(fluorosulfonyl)imide $LiN(SO_2CF_3)_2$ (LiTFSI), and lithium bis(fluorosulfonyl)imide $Li(FSO_2)_2N$ (LiFSI), which may be used alone or in combination.

The total solid content of the composition (C) of the present invention is typically comprised between 5% and 50% wt, preferably from 10% to 30% wt, more preferably from 12% to 25% wt over the total weight of the composition (C). The total solid content of the composition (C) is understood to be cumulative of all non-volatile ingredients thereof, notably including polymer (A), inorganic particle (IP) and any solid, non-volatile additional additive.

According to a first variant of this first object of the invention, composition (C) does not include lithium salt as additive, and polymer (A) is defined as an ionically non-conductive polymer.

In one embodiment according to this first variant, composition (C) preferably comprises:

i) at least one ionic conductive solid inorganic substance in the form of powder [inorganic particle (IP)] as above defined in an amount ranging from 90% to 99% based on the total weight of the inorganic particle (IP) and the polymer (A) in the composition (C); and ii) at least one vinylidene fluoride (VDF) copolymer [polymer (A)] as above defined in an amount ranging from 1% to 10%, preferably from 2% to 5% based on the total weight of the inorganic particle (IP) and the polymer (A) in the composition (C); and iii) at least one solvent (S).

According to a second variant of this first object of the invention, composition (C) includes at least one lithium salt as additive, and polymer (A) is defined as an ionically conductive polymer.

In one embodiment according to this second variant, composition (C) preferably comprises:

i) at least one ionic conductive solid inorganic substance in the form of powder [inorganic particle (IP)] as above defined in an amount ranging from 50% to 98%, preferably from 60% to 95%, still more preferably from 60% to 80%, based on the total weight of the inorganic particle (IP) and the polymer (A) in the composition (C); and ii) at least one vinylidene fluoride (VDF) copolymer [polymer (A)] as above defined in an amount ranging from 2% to 50%, preferably from 20% to 40% based on the total weight of the inorganic particle (IP) and the polymer (A) in the composition (C);

iii) at least one solvent (S);

and iv) at least one lithium salt as above defined, wherein the at least one lithium salt is present in an amount ranging from 20% to 60%, preferably of about 30%, based on the total weight of the polymer (A).

A second object of the invention is a process for manufacturing the composition (C) as detailed above, said process comprising mixing:

the i) at least one ionic conductive solid inorganic substance in the form of powder [inorganic particle (IP)] as above defined;

the ii) at least one vinylidene fluoride (VDF) copolymer [polymer (A)] as above defined; and the at least one solvent (S) as above defined; and optionally, the at least one additive as above defined.

In one embodiment, the process according to the invention comprises the steps of:

a) dispersing the at least one inorganic particle (IP) in at least one solvent (S);

b) preparing a solution of at least one polymer (A) in the at least one solvent (S);

c) mixing and stirring the dispersion obtained in step a) with the solution obtained in step b).

Should any additive being present in composition (C), it may be added in any of the steps a) to c) above.

In on embodiment of the invention, a composition (C) comprising at least one lithium salt as additive is prepared according to the process as above defined, wherein the said at least one lithium salt is added to the polymer solution provided in step b) of the process.

In another embodiment, the process according to the invention comprises the steps of:
a) preparing a solution of at least one polymer (A) in the at least one solvent (S);
b) dispersing the at least one inorganic particle (IP) in the solution obtained in step a);
c) mixing and stirring the dispersion obtained in step b).

In still another embodiment, the process according to the invention comprises the steps of:
a) preparing a dispersion of the at least one inorganic particle (IP) in the at least one solvent (S);
b) adding the at least one polymer (A) to the dispersion obtained in step a);
c) mixing and stirring the dispersion obtained in step b).

The process of the invention for manufacturing the composition (C) as detailed above may further include milling and/or dispersing steps in order to improve the dispersion quality of the composition (C).

Composition (C) is particularly suitable for use in the preparation of composite solid electrolytes for solid state batteries.

A third object of the invention is a process for manufacturing a solid composite electrolyte (CE) comprising the steps of:
I) processing the composition (C) as above defined to form a wet film of a solid composite electrolyte; and
II) drying the wet film provided in step I) to obtain a solid composite electrolyte.

Under step I) of the process of the invention composition (C) can be processed into a film by any method known in the art, such as by casting or extruding the composition (C) to obtain a wet solid uniform film.

Under step II) of the process of the invention, drying may be performed either under atmospheric pressure or under vacuum. Alternatively, drying may be performed under modified atmosphere, e.g. under an inert gas, typically exempt notably from moisture (water vapour content of less than 0.001% v/v).

The drying temperature will be selected so as to have the effective removal by evaporation of one or more solvents (S) from the wet film of solid composite electrolyte of the invention.

In a fourth object, the present invention pertains to the solid composite electrolyte (CE) obtainable by the process as above defined.

Composition (C) is also suitable for use in the preparation of electrodes for solid state batteries.

A further object of the invention is thus a process for manufacturing an electrode (E) for solid state battery comprising the steps of:
I) providing an electrode-forming composition comprising the composition (C) as above defined, at least one electrode active material and, optionally, an electroconductivity-imparting additive;
II) providing a metal substrate having at least one surface;
III) applying the composition (C) provided in step I) onto the at least one surface of the metal substrate provided in step II), thereby providing an assembly comprising a metal substrate coated with said composition (C) onto the at least one surface;
IV) drying the assembly provided in step III).

Under step IV) of the process, drying may be performed either under atmospheric pressure or under vacuum. Alternatively, drying may be performed under modified atmosphere, e.g. under an inert gas, typically exempt notably from moisture (water vapour content of less than 0.001% v/v).

The drying temperature will be selected so as to have the effective removal by evaporation of one or more solvents (S) from the electrode of the invention.

In a further object, the present invention pertains to the electrode (E) obtainable by the process as above defined.

According to a preferred embodiment, the electrode (E) of the present invention is a positive electrode.

According to said embodiment, the preferred electrode-forming composition comprising the composition (C) used in step I) of the process comprises, in addition to composition (C) as above defined, at least one positive electrode active material (pAM), which may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

As an alternative, still in the case of forming a positive electrode for a lithium ion battery, the active substance may comprise a lithiated or partially lithiated transition metal oxyanion-based electrode materials of the nominal formula $AB(XO_4)_f E_{1-f}$, in which A is lithium, which may be partially substituted by another alkali metal representing less than 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1 (extremes included).

The above $AB(XO_4)_f E_{1-f}$ active substances are preferably phosphate-based and may have an ordered or modified olivine structure.

More preferably, the active substance as above described complies with formula $Li_{3-x}M'_y M''_{2-y}(XO_4)_3$ in which: $0 \le x \le 3$, $0 \le y \le 2$; M' and M'' are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which $0 \le x \le 1$, wherein x is preferably 1 (that is to say, Lithium Iron Phosphate of formula: $LiFePO_4$).

According to another preferred embodiment, the electrode (E) of the present invention is a negative electrode.

According to said embodiment, the preferred electrode-forming composition comprising the composition (C) used in step I) of the process comprises, in addition to composition (C) as above defined, at least one negative electrode active material (nAM) which may comprise a carbon-based material or a silicon-based material.

In some embodiments, the carbon-based material may be, for example, graphite, such as natural or artificial graphite, graphene, or carbon black. These materials may be used alone or as a mixture of two or more thereof. The carbon-based material is preferably graphite.

The silicon-based material may be one or more selected from the group consisting of silicon, alkoxysilane, aminosilane, silicon carbide and silicon oxide. Preferably, the silicon-based material is silicon.

An optional electroconductivity-imparting additive may be added in order to improve the conductivity of a resulting electrode. Examples thereof may include: carbonaceous materials, such as carbon black, graphite fine powder carbon nanotubes, graphene, or fiber, or fine powder or fibers of metals such as nickel or aluminum. The optional electroconductive additive is preferably carbon black. Carbon black is available, for example, under the brand names, Super P® or Ketjenblack®. When present, the electroconductive additive is different from the carbon-based material described above.

In still a further object, the present invention provides an electrochemical device comprising a solid composite electrolyte (CE) and/or at least one electrode (E) of the present invention.

The electrochemical device is preferably a secondary battery, more preferably a solid state secondary battery.

In particular, the present invention further pertains to a solid state secondary battery comprising:
 a positive electrode,
 a negative electrode,
 a composite solid electrolyte,
wherein the composite solid electrolyte is the composite solid electrolyte (CE) of the invention.

In another embodiment, the present invention pertains to a solid state secondary battery comprising:
 a positive electrode,
 a negative electrode,
 a composite solid electrolyte,
wherein at least one of the positive and the negative electrode is the electrode (E) of the invention.

In still another embodiment, the present invention pertains to a solid state secondary battery comprising:
 a positive electrode,
 a negative electrode,
 a composite solid electrolyte,
wherein the composite solid electrolyte is the composite solid electrolyte (CE) of the invention and
wherein at least one of the positive and the negative electrode is the electrode (E) of the invention.

Ionic conductivity of the solid composite electrolyte may be characterized via ionic resistance/conductivity. The SI unit of ionic resistance is the ohm-meter ($\Omega \cdot m$) and that of ionic conductivity is siemens per meter (S/m), wherein S is $ohm^{-1}$.

Mechanical property may be assessed with the naked eyes in a manner whether a film is i) self-standing without any support, ii) flexible, meaning it can be repeatedly bended without breaking or crack formation and iii) mechanical resistant to deformation. It means that it should be able to resist the physical stress of a pressing/calendaring step during which the porosity of the film is reduced and that it should be compatible with a roll-to-roll or stacking process.

Should the disclosure of any patents, patent applications, and publications which are incorporated herein by reference conflict with the description of the present application to the extent that it may render a term unclear, the present description shall take precedence.

The invention will be now illustrated in more detail by means of the following examples whose purpose is merely illustrative and not limitative of the scope of the invention.

EXPERIMENTAL PART

Raw Materials

Solid Inorganic Particles:

W-doped LLZO, having composition of $Li_{6.3}La_3Zr_{1.65}W_{0.35}O_{12}$.

Ionically Non-Conductive Polymers:

Solef®5130 (PVDF/AA copolymer) available from Solvay Specialty Polymers Italy S.p.A Polymer (A-1): VDF-AA (1.0% by moles)-PMVE (1.7% by moles) polymer having an intrinsic viscosity of 0.294 l/g in DMF at 25° C.

Polymer (A-2): Solef®31508 (PVDF/CTFE copolymer) available from Solvay Specialty Polymers Italy S.p.A Polymer (A-3): Solef®32008 (PVDF/CTFE copolymer) available from Solvay Specialty Polymers Italy S.p.A Polymer (A-4): Solvene® 300 (PVDF/TrFE copolymer) available from Solvay Specialty Polymers Italy S.p.A Polymer (A-5): Solef®21216 (VDF-HFP copolymer) available from Solvay Specialty Polymers Italy S.p.A.

Polymer (A-6): VDF/HFP (2.5% by moles)/HEA (0.4% by moles) copolymer

Example 1

Composite Electrolyte Composition Comprising VDF/PMVE/AA Copolymer 1.5 g of the perfectly dried polymer (A-1) powder was dissolved in 18 g of DMF using a magnetic stirrer overnight obtaining the solution S1.

2.25 g of LLZWO was dispersed in 2 g of DMF using a magnetic stirrer overnight obtaining the dispersion D1.

Dispersion D1 was added to S1 obtaining the mixture M1; the vial containing D1 was rinsed with 2 ml of DMF and added to M1; the inorganic to polymer ratio in M1 was 60% wt to 40% wt. The mixture M1 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 2

Composite Electrolyte Composition Comprising VDF/CTFE Copolymer 1.5 g of the perfectly dried polymer (A-2) powder was dissolved in 18 g of DMF using a magnetic stirrer overnight obtaining the solution S2.

2.25 g of LLZWO was dispersed in 2 g of DMF using a magnetic stirrer overnight obtaining the dispersion D2.

Dispersion D2 was added to S2 obtaining the mixture M2; the vial containing D2 was rinsed with 2 ml of DMF and added to M2; the inorganic to polymer ratio in M2 was 60 wt % to 40 wt %. The mixture M2 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 3

Composite Electrolyte Composition Comprising VDF/CTFE Copolymer 1.5 g of the perfectly dried polymer (A-3) powder was dissolved in 18 g of DMF using a magnetic stirrer overnight obtaining the solution S3.

2.25 g of LLZWO was dispersed in 2 g of DMF using a magnetic stirrer overnight obtaining the dispersion D3.

Dispersion D3 was added to S3 obtaining the mixture M3; the vial containing D3 was rinsed with 2 ml of DMF and added to M3; the inorganic to polymer ratio in M3 was 60 wt % to 40 wt %. The mixture M3 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 4

Composite Electrolyte Composition Comprising PVDF/TrFE Copolymer 1.5 g of the perfectly dried polymer (A-4) powder was dissolved in 18 g of DMF using a magnetic stirrer overnight obtaining the solution S4.

2.25 g of LLZWO was dispersed in 2 g of DMF using a magnetic stirrer overnight obtaining the dispersion D4.

Dispersion D4 was added to S4 obtaining the mixture M4; the vial containing D4 was rinsed with 2 ml of DMF and added to M4; the inorganic to polymer ratio in M4 was 60 wt % to 40 wt %. The mixture M4 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 5

Composite Electrolyte Composition Comprising VDF/HFP Copolymer 1.5 g of the perfectly dried polymer (A-5) powder was dissolved in 18 g of DMF using a magnetic stirrer overnight obtaining the solution S5.

2.25 g of LLZWO was dispersed in 2 g of DMF using a magnetic stirrer overnight obtaining the dispersion D5.

Dispersion D5 was added to S5 obtaining the mixture M5; the vial containing D5 was rinsed with 2 ml of DMF and added to M5; the inorganic to polymer ratio in M5 was 60 wt % to 40 wt %. The mixture M5 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 6

Composite Electrolyte Composition Comprising VDF/HFP (2.5% by Moles)/HEA (0.4% by Moles) Copolymer 1.5 g of the perfectly dried polymer (A-6) powder was dissolved in 18 g of DMF using a magnetic stirrer overnight obtaining the solution S6.

2.25 g of LLZWO was dispersed in 2 g of DMF using a magnetic stirrer overnight obtaining the dispersion D5.

Dispersion D6 was added to S6 obtaining the mixture M6; the vial containing D6 was rinsed with 2 ml of DMF and added to M6; the inorganic to polymer ratio in M6 was 60 wt % to 40 wt %. The mixture M6 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 7—Comparative

Composite Electrolyte Composition Comprising PVDF/AA Copolymer 1.5 g of the perfectly dried polymer powder was dissolved in 18 g of DMF using a magnetic stirrer overnight obtaining the comparative solution CS1.

2.25 g of LLZWO was dispersed in 2 g of DMF using a magnetic stirrer overnight obtaining the comparative dispersion CD1.

Dispersion CD1 was added to CS1 obtaining the comparative mixture CM1; the vial containing CD1 was rinsed with 2 ml of DMF and added to CM1; the inorganic to polymer ratio in CM1 was 60 wt % to 40 wt %. The mixture CM1 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Example 8—Comparative

Composite Electrolyte Composition Comprising PVDF Homopolymer 1.5 g of the perfectly dried polymer powder was dissolved in 18 g of DMF using a magnetic stirrer overnight obtaining the comparative solution CS2.

2.25 g of LLZWO was dispersed in 2 g of DMF using a magnetic stirrer overnight obtaining the comparative dispersion CD2.

Dispersion CD2 was added to CS2 obtaining the comparative mixture CM2; the vial containing CD2 was rinsed with 2 ml of DMF and added to CM2; the inorganic to polymer ratio in CM2 was 60 wt % to 40 wt %. The mixture CM2 was mixed vigorously at 500 rpm in speed mixer for 2 minutes and then maintained under slow mixing (100 rpm) at a temperature of 30° C. for all the duration of the experiment. At specific times, small samples were taken and poured in a cup for viscosity measurement.

Rheology Measurement

The quantitative analysis was performed with rheology measurements (Anton Par RheolabQC).

The measure was registered at time 0 and after 7 hours and the viscosity at 10 s$^{-1}$ was considered for comparison. Data at 0 hours and after 7 hours are reported in Table 1.

| | viscosity 10 s$^{-1}$[mPa*s] | | | | | | | |
|---|---|---|---|---|---|---|---|---|
| time [h] | CM1 | CM2 | M1 | M2 | M3 | M4 | M5 | M6 |
| 0 | 604 | 1284 | 807 | 23 | 23 | 11 | 385 | 56 |
| 7 | 30970 | 6236 | 503 | 43 | 22 | 47 | 731 | <500 |

The data in Table 1 show that the viscosities of PVDF homopolymer mixture CM2 and of VDF/AA mixture CM1 increase in few hours becoming higher than 5000 mPa*s, while for the mixtures M1-M6 according to the invention the viscosity increase of the samples, if any, is limited in the same time interval.

In addition, a sudden change in color from light brown to dark was observed for the CM1 and CM2 mixtures, while for the mixtures M1-M6 according to the invention the change in color, if any, was less evident.

The mixtures according to the invention are thus more resistant to gelation issues, and can be conveniently used for solid composite conductive membranes preparation with various techniques, such as by casting.

The invention claimed is:

1. An ionically conductive composition (C) suitable for use in the preparation of components for solid state batteries, said composition comprising:
   i) at least one ionic conductive solid inorganic substance in the form of powder [inorganic particle (IP)] having the following general formula:

$M1_aM2_bM3_cO_d$, wherein
   M1 is a first cationic element selected from the group consisting of H, Li, Na, and Ga, preferably Li;
   M2 is a second cationic element selected from the group consisting of La, Ba, Sr, Ca, In, Mg, Y, Sc, Cr, Al, K, Ce, Pr, Nd, Pm, Sm, Eu, Gd, Tb, Dy, Ho, Er, Tm, Yb and Lu;
   M3 is a third cationic element selected from the group consisting of Zr, Ta, Nb, Sb, Sn, Hf, Bi, W, Si, Se, Ga and Ge; and
   a, b, c, and d are positive numbers including various combinations of integers and decimals;
   ii) at least one vinylidene fluoride (VDF) copolymer [polymer (A)] that comprises:
   (a) recurring units derived from vinylidene fluoride (VDF);
   (b) recurring units derived from at least one fluorinated monomer different from VDF [monomer (FM)] selected from the group consisting of:
   (b-1) $C_2$-$C_8$ fluoro- and/or perfluoroolefins such as tetrafluoroethylene (TFE), hexafluoropropylene (HFP), pentafluoropropylene and hexafluoroisobutylene;
   (b-2) $C_2$-$C_8$ hydrogenated monofluoroolefins, such as vinyl fluoride; 1,2-difluoroethylene and trifluoroethylene (TrFE);
   (b-3) perfluoroalkylvinylethers complying with formula $CF_2$=$CFOR_{f1}$, in which $R_{f1}$ is a $C_1$-$C_6$-perfluoroalkyl group; and
   (b-4) perfluorooxyalkylvinylethers complying with formula $CF_2$=$CFOR_{OF}$, with $R_{OF}$ being a $C_1$-$C_{12}$-perfluorooxyalkyl, which comprises one or more than one ethereal oxygen atom;
   (b-5) a chloro- and/or bromo- and/or iodo-$C_2$-$C_6$ fluoroolefins; and
   (c) optionally, recurring units derived from at least one hydrophilic (meth)acrylic monomer (MA) of formula (I):

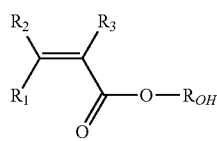

wherein each of $R_1$, $R_2$, $R_3$, equal or different from each other, is independently an hydrogen atom or a $C_1$-$C_3$ hydrocarbon group, and $R_{OH}$ is a hydrogen or a $C_1$-$C_5$ hydrocarbon moiety comprising at least one —OH group,
   iii) at least one solvent (S) selected from the group consisting of:
   alcohols,
   ketones,
   linear or cyclic esters,
   linear or cyclic amides, and
   dimethyl sulfoxide.

2. The composition (C) according to claim 1 wherein the inorganic particle (IP) is $Li_7La_3Zr_2O_{12}$ (LLZO).

3. The composition (C) according to claim 1 wherein the inorganic particle is doped-LLZO inorganic particle having a general formula of $Li_xLa_yZr_zA_wO_{12}$, wherein:
   A represents one or several dopants selected from the group consisting of Al, Ga, Nb, Fe, Nd, Pt, Ta, W, Mo, Hf, Si, Ca, Sr, Ba, Ge, and mixtures thereof;
   w, x, y, and z are positive numbers, including various combinations of integers and fractions or decimals;
   $0<y\leq3$;
   $0<z\leq2$;
   $0\leq w\leq0.5$; and
   x is derived from electroneutrality of the garnet structure.

4. The composition (C) according to claim 1 wherein monomer (MA) is selected from the group consisting of acrylic acid, methacrylic acid and hydroxyethyl (meth)acrylate.

5. The composition (C) according to claim 1 wherein polymer (A) comprises:
   (a) at least 60% by moles of recurring units derived from VDF;
   (b) at least 2% by moles of recurring units derived from monomer (FM); and
   (c) optionally from 0.05% to 2% by moles of recurring units derived from at least one monomer (MA),
   wherein all the aforementioned % by moles is referred to the total moles of recurring units of the polymer (A).

6. The composition (C) according to claim 1 wherein polymer (A) is selected from the group consisting of: VDF/TrFE copolymers, VDF/PMVE/AA copolymers, VDF/HFP copolymers, VDF/CTFE copolymers, and VDF/HFP/HEA copolymers.

7. The composition (C) according to claim 1 wherein solvent (S) is selected from the group consisting of:
   alcohols,
   ketones,
   linear or cyclic esters,
   linear or cyclic amides, and
   dimethyl sulfoxide.

8. The composition (C) according to claim 1 which further includes at least one additive selected from the group consisting of Li salts, dispersants, wetting agents, viscosity diluters and anti-swelling agents.

9. A process for manufacturing the composition (C) according to claim 1, said process comprising steps of:
   a) dispersing the at least one inorganic particle (IP) in at least one solvent (S);
   b) preparing a solution of at least one polymer (A) and, optionally, at least one additive, in the at least one solvent (S);
   c) mixing and stirring the dispersion obtained in step a) with the solution obtained in step b).

10. A process for manufacturing a solid composite electrolyte (CE) comprising the steps of:
   I) processing a composition (C) according claim 1 to form a wet film of a solid composite electrolyte; and
   II) drying the wet film provided in step (I) to obtain a solid composite electrolyte.

11. A solid composite electrolyte (CE) obtained by the process according to claim 10.

12. A process for manufacturing an electrode (E) for solid state battery comprising the steps of:
   I) providing an electrode-forming composition comprising the composition (C) according to claim 1, at least one electrode active material and, optionally, an electroconductivity-imparting additive;
   II) providing a metal substrate having at least one surface;
   III) applying the composition (C) provided in step I) onto the at least one surface of the metal substrate provided in step II), thereby providing an assembly comprising a metal substrate coated with said composition (C) onto the at least one surface;
   IV) drying the assembly provided in step III).

13. An electrode obtained by the process according to claim 12.

14. An electrochemical device comprising a solid composite electrolyte (CE) according to claim 11.

15. An electrochemical device comprising at least one electrode (E) according to claim 13.

16. The electrochemical device according to claim 14 that is a solid state battery.

17. The electrochemical device according to claim 15 that is a solid state battery.

* * * * *